April 19, 1938. R. C. OSTERSTROM Re. 20,703
METHOD OF TREATING HYDROCARBON DISTILLATES
Original Filed April 19, 1929
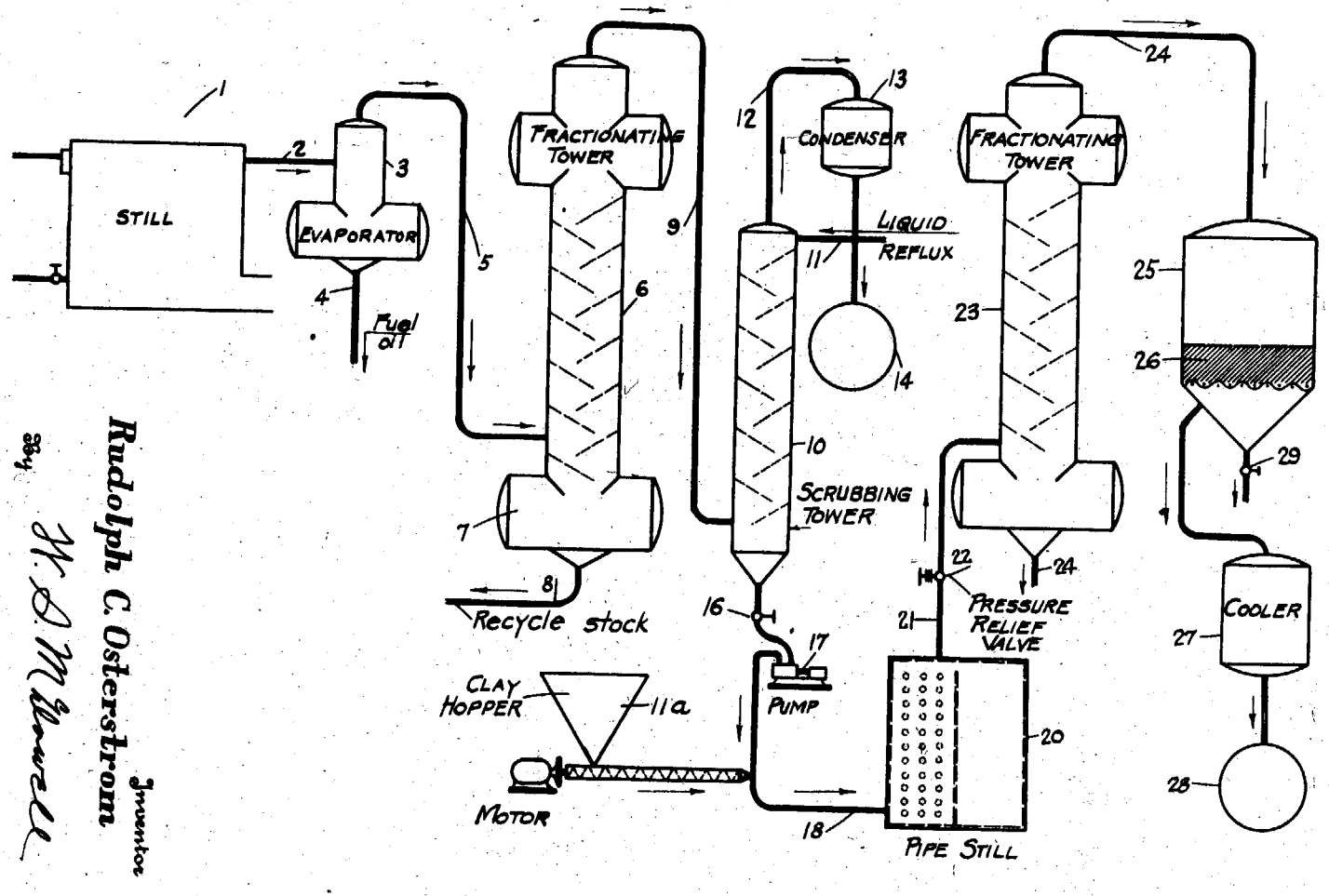
Inventor
Rudolph C. Osterstrom
By W. S. McDowell
Attorney Reissued Apr. 19, 1938

Re. 20,703

UNITED STATES PATENT OFFICE 20,703

METHOD OF TREATING HYDROCARBON DISTILLATES

Rudolph C. Osterstrom, Kenilworth, Ill., assignor to The Pure Oil Company, Chicago, Ill., a corporation of Ohio Original No. 1,897,328, dated February 14, 1933, Serial No. 356,569, April 19, 1929. Application for reissue September 18, 1934, Serial No. 744,563

5 Claims. (Cl. 196—79)

This invention relates to an improved method of treating hydrocarbon distillates, particularly distillates obtained from cracking stills, and has for its primary object the provision of a method whereby undesirable compounds present in such distillates, for example, gum-forming and color-imparting bodies, may be readily removed from the distillates and an end product obtained of a purified character having a boiling range comparable with that of gasoline.

The value of fuller's earth as a treating agent for removing undesirable compounds from cracked petroleum vapors is well understood by oil refiners. The operation is based on the theory that the oil vapors while penetrating a bed of fuller's earth react to polymerize the undesirable compounds which discolor the oil and produce gum deposits therein.

The present invention has for an outstanding object the provision of a system wherein greater and more improved contact is obtained between the oil vapor undergoing purification and the fuller's earth than has heretofore been attained, to the end of providing for a more efficient process in the matter of more completely eliminating the undesirable compounds present in the oil at the same time to carry out the process in an economic manner wherein clay waste particularly is avoided.

It is another object of the invention to provide a process of this character wherein the oil to be treated, together with finely divided fuller's earth, is passed in unison through a heated zone and subjected to conditions of temperature and pressure necessary to effect polymerization reactions, and wherein the oil and clay after passing through said zone are admitted into an expander for the purpose of separating the liquid clay-polymer containing fraction of the oil from the lighter vaporous fraction, and wherein provision is made for passing the said lighter and vaporous fraction through a stationary bed of fuller's earth so as to effectively remove from the desired oil all color and gum-forming bodies to the end that the final product when condensed and liquefied may be stored, transported and otherwise handled in a customary commercial manner under ordinary conditions without suffering loss of value by reason of gum formation or lack of proper color.

For a further understanding of the invention reference is to be had to the following description and the accompanying drawing wherein the figure represents a diagrammatic view disclosing conventionally the apparatus used in carrying the present invention into operation.

Referring more particularly to the drawing the numeral 1 designates a cracking still, converter, reaction chamber or distillation unit, whichever the case may be. In this connection it will be understood that the invention may be used in the purifying of vapors released from (1) a vapor phase converter or other high temperature unit for effecting the molecular decomposition of the oil while the latter is in the vapor phase; (2) the cracking still of a liquid phase converter; (3) the reaction chamber or expander of a liquid phase converting system; or (4) a pipe still, a shell still or other source of hydrocarbon vapor supply. In all of these operations vapors may be produced containing undesirable compounds. In vapor phase systems of conversion this is particularly true, wherein the released vapors must be treated to remove therefrom gums, color, odor producing and other compounds which require elimination before the end product can be commercially distributed. While a cracked vapor phase distillate especially needs treatment, distillates obtained from liquid phase cracking systems also require similar treatment and in many instances vapors from distillation units wherein no conversion or cracking of the oil under treatment takes place.

From the unit 1 vapors which are generated therein pass by a pipe 2 to an evaporator 3. The materials which are unvaporized in the unit or which condense in the evaporator collect as liquids in the bottom of said evaporator and are withdrawn by way of the line 4 preferably as fuel oil. The vapors remaining in the evaporator 3 pass overhead by way of the line 5, and enter a fractionating tower 6 of any suitable construction. In this tower the liquid condensate which accumulates in the bottom drum 7 thereof is withdrawn by way of a pipe line 8 and may, if desired, be employed as recycle stock or, in other words, may be recirculated through the unit or still 1 for additional heat treatment.

The vapors which are discharged from the top of the tower 6 are conducted by way of the pipe line 9 into the lower portion of a scrubbing tower 10. The top of this tower is provided with a line 11 by means of which liquid reflux oil commingled with fuller's earth, finely divided clay or diatomaceous earths are introduced into the top of the tower 10 for direct contact with the ascending vapors passing through said tower. The clay-bearing reflux oil descends through the tower 10 in counter-current flow to the ascending vapors, thus removing from said vapors all high boiling point materials which may be entrained in said vapors. In addition, the vapors are subjected to direct contact to a limited degree with the clay-treating material in order to remove from the vapors the undesirable constituents which it may possess These vapors pass overhead from the tower 10 by way of the pipe line 12 and may circulate through a condenser 13 and then to a storage tank 14 as a treated end product.

There collects in the bottom of the tower 10 a quantity of liquefied hydrocarbons, consisting of the reflux oil introduced by way of the line 11 and the heavier condensed oils obtained from the vapors flowing through the tower 10, which oils are mixed with the clay treating materials introduced by way of the line 11, or by the hopper 11*a*. These condensed oils and clay treating material pass from the tower 10 by way of a pipe line 15 in which is provided a control valve 16 and are led into a pump 17, in order that said oils, together with the thoroughly intermingled or commingled clays may be forced through a pipe line 18 leading to a coil bank 19 arranged within the setting of a pipe still 20. Through the medium of the pump 17 relatively high pressures are maintained on the oil under heat treatment in the pipe still. These pressures may be approximately 200 pounds per square inch and at the same time the oil within the pipe still is heated to a temperature of approximately 650° F. These temperatures and pressures have been found to be highly effective in securing proper reactions in the matter of effecting the polymerization of undesirable compounds. I have observed that the higher the temperature the greater is the efficiency of the treating material and for this reason I employ temperatures considerably higher than those utilized in prior processes. Even at the temperatures and pressures specified the oil thus undergoing treatment remains or is maintained in the vapor phase. I am aware of the fact that it has been proposed to keep the oil under treatment in the liquid phase by the use of high pressures and while in contact with the clay-treating material and then to suddenly release said pressures by permitting the oil to expand rapidly in an enlarged fractionating column or other enlarged chamber. In the present invention, however, while high temperatures and pressures are used no effort is made to maintain the oil in the liquid phase strictly, the pressures utilized being high enough to thoroughly impregnate the clay with the oil under treatment.

After circulation through the coil bank of the pipe still the oil is passed through a pipe line 21 provided with a pressure release valve 22, and thence into a fractionating tower 23, where the oil vapor may be maintained at a pressure slightly above atmospheric. The clay and the polymerized hydrocarbons in liquid form are collected in the bottom of the tower 23 and may be continuously removed therefrom by a pipe line 24, the lighter or desired fractions passing overhead from said fractionating tower 23 by way of a pipe line 24 to a tower 25. This tower contains a bed of fuller's earth through which the oil vapors penetrate, the fuller's earth being maintained in a stationary condition within the tower. By contacting with the stationary bed of fuller's earth, which is designated by the numeral 26, the faint or final traces of impurities which may remain in the distillate following release from the fractionating tower 23 are completely removed from the oil, and the latter is then conducted to a condenser 27 and following cooling and liquefaction to a storage tank 28, the heavy polymerized fractions being removed from the tower by way of the polymer outlet 29.

The liquefied hydrocarbons which are collected in the tank 28 are substantially free from compounds which tend to discolor the same or to produce gums or resinous substances therein. These oils since they possess the boiling range of ordinary gasoline may be used as motor fuels and possess a water-white color, a satisfactory odor, good stability in color upon exposure to light or upon standing and possess a very low or practically negligible gum content, which remains low even after long periods of storage.

What is claimed is:

1. The method of decolorizing and degumming petroleum oils comprising adding a catalytic material in finely divided form to a flowing stream of oil, subjecting the flowing stream of said mixture to temperatures in excess of 500° F. and to pressures in excess of 200 pounds per square inch, releasing said superatmospheric pressure, discharging the mixture into a vaporizing and fractionating zone, separately discharging treated oil vapors and catalytic materials from said zone, and passing the treated oil vapors through a stationary bed of said catalytic materials.

2. The method of treating previously untreated cracked gasoline distillates which consists in mixing same with a treating material comprising a solid, finely divided adsorbent, heating the mixture while maintaining an autogenous pressure thereon until a substantial improvement in the oil material results, then releasing said pressure and distilling off the fractions of the final gasoline and subjecting the produced vapors to treatment with an adsorbent purifying material and condensing the vapors so treated.

3. The method of treating previously untreated gasoline distillates which consists in forming a mixture of said distillate and a treating material comprising a solid, finely divided adsorbent, heating said mixture under superatmospheric pressure and for a period sufficient to bring about a substantial improvement of the oil, separating the lighter desired fractions by releasing the pressure on the mixture, then contacting the so separated vapors with fresh treating material.

4. The method of treating raw gasoline distillates which consists in subjecting said distillate to contact with a solid adsorbent catalytic material while under a pressure in excess of 200 pounds per square inch and a temperature in excess of 500° F. for a period sufficient to bring about a substantial improvement of said distillate, reducing the pressure upon said treated distillate to effect a separation of vapors of desired gasoline constituents from liquid products of said treatment, then contacting the so separated vapors with fresh solid adsorbent catalytic material, and finally condensing the thereby treated vapors.

5. The method of treating previously untreated gasoline distillates which consists in forming a mixture of said distillate and a treating material comprising a solid, finely divided adsorbent, heating said mixture under sufficient pressure to thoroughly impregnate the adsorbent with the oil under treatment and for a period of time sufficient to bring about a substantial improvement of the oil, separating the lighter desired fractions by releasing the pressure on the mixture, then contacting the so-separated vapors with fresh treating material.

RUDOLPH C. OSTERSTROM.